(12) United States Patent
Bartlett

(10) Patent No.: US 6,377,401 B1
(45) Date of Patent: Apr. 23, 2002

(54) HEAD TRACKER SYSTEM

(75) Inventor: Christopher T Bartlett, Maidstone (GB)

(73) Assignee: BAE Systems Electronics Limited, Middlesex (GB)

( * ) Notice: Subject to any disclaimer, the term of this patent is extended or adjusted under 35 U.S.C. 154(b) by 0 days.

(21) Appl. No.: 09/622,312

(22) PCT Filed: Jul. 11, 2000

(86) PCT No.: PCT/GB00/02658

§ 371 Date: Aug. 14, 2000

§ 102(e) Date: Aug. 14, 2000

(87) PCT Pub. No.: WO01/07995

PCT Pub. Date: Feb. 1, 2001

(30) Foreign Application Priority Data

Jul. 28, 1999 (GB) .............................. 9917591

(51) Int. Cl.[7] .......................... G02B 27/14; G09G 5/10
(52) U.S. Cl. ........................................ 359/630; 345/8
(58) Field of Search ................. 359/629, 630, 359/632, 462, 466, 815; 2/6.1, 7; 345/7, 8, 9

(56) References Cited

U.S. PATENT DOCUMENTS

| | | | | |
|---|---|---|---|---|
| 5,416,922 A | * | 5/1995 | Horvat et al. ............ | 2/6.2 |
| 5,742,263 A | | 4/1998 | Wang et al. | |
| 6,042,239 A | * | 3/2000 | Liepmann et al. ........ | 359/601 |
| 6,046,712 A | * | 4/2000 | Beller et al. ............. | 345/8 |
| 6,057,810 A | * | 5/2000 | Roell et al. .............. | 345/8 |
| 6,124,838 A | * | 9/2000 | Lasko-Harvill et al. ... | 345/8 |
| 6,249,386 B1 | * | 6/2001 | Yona et al. .............. | 359/630 |

FOREIGN PATENT DOCUMENTS

| | | |
|---|---|---|
| EP | 0 162 713 | 11/1985 |
| EP | 0 209 411 | 1/1987 |
| GB | 2 300 988 A | 11/1996 |
| GB | 2 301 968 A | 12/1996 |
| WO | 79/00260 A1 | 5/1979 |

* cited by examiner

*Primary Examiner*—Georgia Epps
*Assistant Examiner*—Saeed Seyrafi
(74) *Attorney, Agent, or Firm*—Nixon & Vanderhye P.C.

(57) ABSTRACT

A head tracker system for determining a user's head orientation relative to a datum comprises: a head mounting, preferably a helmet (2), for attachment to the user's head and a sensor system (10,12) for sensing the orientation of the head mounting (2) relative and the datum. A distinguishable marking (26) is provided at a first known point fixed relative to the head mounting or a second known point fixed relative to the datum. At the other known point an optical sensor (18), preferably a video camera, is mounted. The system further comprises processing means (28) for determining when the marking is within the field of view of the optical sensor and the output of the processing means is used to correct for drift in the sensor system or to provide an independent verification that the system is functioning within preselected tolerances.

14 Claims, 1 Drawing Sheet

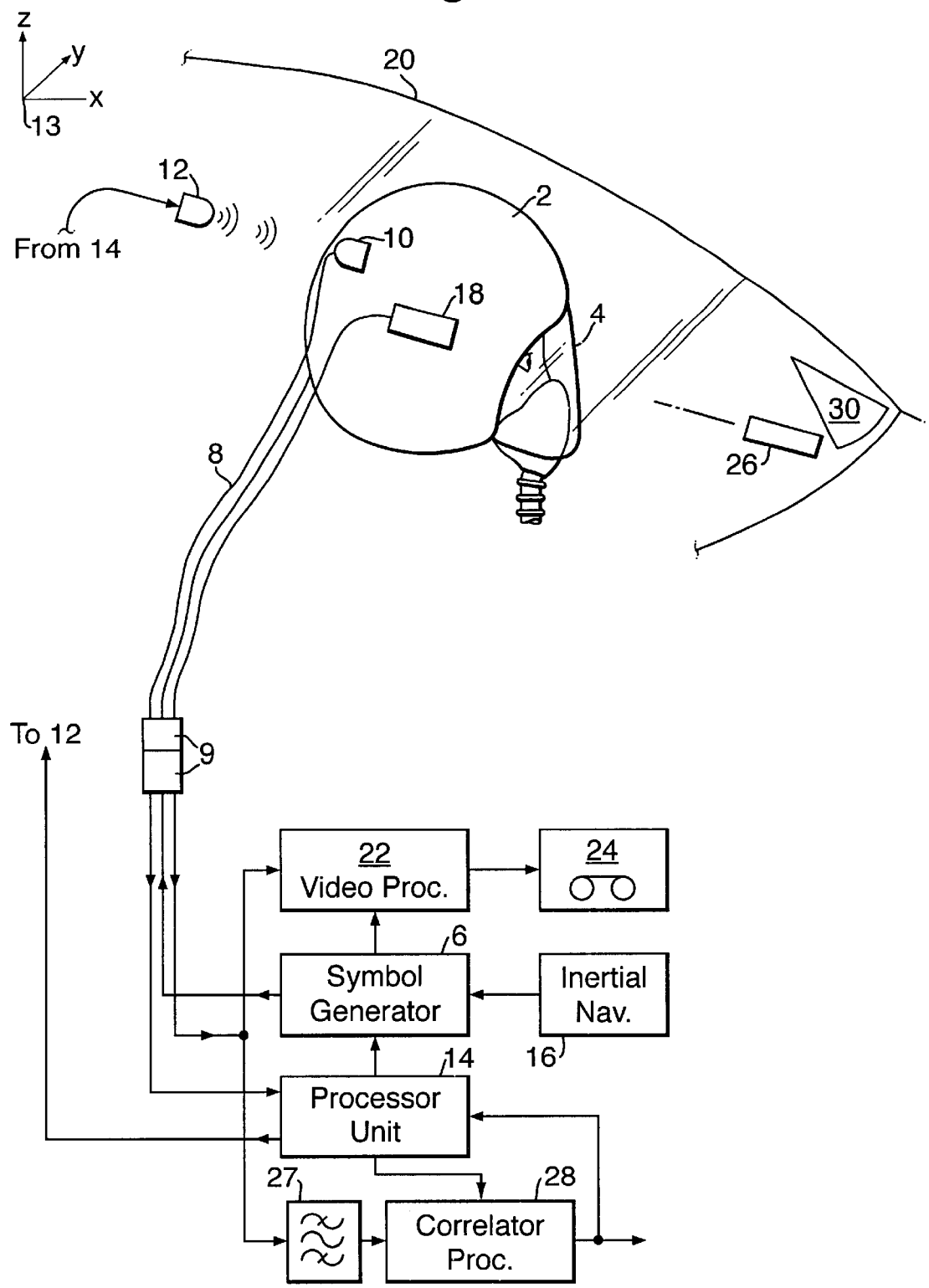

HEAD TRACKER SYSTEM

BACKGROUND OF THE INVENTION

1. Field of the Invention

This invention relates to a head tracker system and more especially, although not exclusively, to a head tracker system for use in an aircraft in which the pilot is provided with a helmet-mounted display.

2. Discussion of Prior Art

Head tracker systems are well known and operate to determine a user's head orientation and position relative to a fixed datum. Originally these systems were developed for use in military aviation but have recently found applications in virtual reality systems.

Since the earliest days of military aviation, pilots have not surprisingly preferred to navigate and aim weapons whilst looking up and out of the cockpit. This led to the evolution of the head-up display (HUD) which displays useful symbology which is appropriately referenced to the outside world (often termed "space stabilised"). HUDs typically have a viewing angle of thirty degrees or less and can consequently only be viewed when the pilot is looking in a generally forward direction. To increase the field of regard (that is the total volume of space over which the pilot can view the symbology and includes the pilot moving his head), helmet-mounted displays (HMDs) have evolved which essentially comprise a HUD which is mounted on the pilot's helmet within his field of view. In order that ground stabilized symbols or imagery are presented to the pilot in the correct orientation with respect to the outside world, the symbol generator of the HUD must know in all three axes, that is elevation, azimuth and roll, where the pilot's head is directed. This is achieved by determining (a) the angular orientation of the pilot's head with respect to the aircraft axes and (b) the orientation (attitude) of the aircraft with the outside world. The former requirement has led to the need for a head tracker system. HMDs operate in conjunction with the head tracker system which determines the angular orientation of the user's head with respect to the aircraft axes to ensure that the displayed information is correctly aligned in space or is accurately superimposed against objects in the outside world. For example, in the case of military aviation it is essential that a weapon aiming marker is accurately aligned over the target.

Typically, a head tracker system comprises a head mounting, most commonly a helmet, which is attached to the user's head and a sensor system for determining the angular orientation of the helmet relative to a fixed reference datum. Although strictly speaking a head tracker system actually tracks the orientation of the head mounting and not the user's head, it provides an accurate measure of the user's head orientation provided the head mounting remains in a fixed orientation relative to the user's head.

The reference datum is typically three axes which pass through a known point on the vehicle or airframe. A number of sensor systems have been proposed. For example, early tracking systems used mechanical linkages between the helmet and the vehicle and, whilst such systems were relatively accurate, they were cumbersome, restricted the user's movement and posed particular problems during ejection from an aircraft. Further systems include optical sensor systems in which the helmet carries a number of light emitting diodes operating in the infra-red which are detected by position sensitive detectors which are mounted to the vehicle cockpit. Other known optical systems use distinctive physical markings which are detected by a camera. Magnetic sensor systems are also known in which an alternating or pulsed magnetic field is detected by sensors on the helmet. Inertial systems have been proposed which use gyroscopes and accelerometers; and hybrid systems which involve a combination of two or more of the above systems.

A particular requirement of a head tracker system for use in military aviation is high accuracy coupled with a fast dynamic response as the pilot's head movements are often extremely rapid; typically these can be greater than two hundred degrees per second. These two qualities are often mutually exclusive and although advances in sensor technology, for example solid state gyroscopes, have increased the dynamic response of the tracker system, the accuracy of some of these systems is limited by drift over extended periods of operation.

It is known to initially set or calibrate, often termed boresighting, the head tracker system before the commencement of operation. For example in the case of military helicopters it is known to provide one, or sometimes two, dedicated boresighted reticle units (BRU) at known lines of sight. The BRU displays a reticle which is presented as a collimated image, often in the form of a circle and cross and which has a narrow viewing angle typically of the order of two degrees. Since the BRU produces a substantially collimated image, the image is essentially presented at infinity and is consequently only visible when the user's head orientation (more particularly that of the helmet) is in a given alignment to the BRU axis. When the pilot boards the helicopter and dons the helmet and HMD he will depress a button to activate a boresight mode of operation. In the boresight mode of operation, the BRU is activated and the suitable boresighting symbology is displayed on the HMD as a space stabilised image. The pilot then uses a hand control to adjust the HMD symbology until it overlaps the BRU. At this point the pilot's eye, HMD symbology and BRU marker are coincident and the system calculates an appropriate offset which is used in subsequent operations in conjunction with the head tracker output to position the HMD symbology. When a second BRU is provided the pilot repeats the procedure, thus providing the tracker system with two known starting conditions. The head tracker system and HMD are only boresighted at the commencement of operation and the BRU is thus of no further use and is consequently often de-activated.

In the case of a fixed wing aircraft which is provided with a HUD it is known to use the HUD to generate the boresight reticle in place of the BRU. Although a HUD will have a larger viewing angle, typically thirty degrees, it still produces a highly collimated image and can consequently be used to accurately orientate the head mounting.

Whilst initial boresighting ensures that the tracker system and HMD operate accurately at the commencement of operation, it cannot compensate for any mechanical misalignment of the HMD with respect to the helmet, nor for any drift in the tracker system. Furthermore whilst the boresighting process may not be lengthy this can still be regarded as an unacceptable delay before the vehicle is operational.

At present HMDs do not achieve the accuracy of HUDs even when operating on the boresight axis due to the limited accuracy of the head tracker which is due in part to drift. Moreover the distributed architecture of HMDs does not easily provide a high level of integrity, that is the assurance that it is providing accurate information. In the case of HMDs which use a binocular display, cross monitoring between the respective channels provides a degree of integrity. However in the case of the head tracker there is no independent parallel path by which the accuracy of the tracker can be verified. The present invention has arisen in an endeavour to provide a head tracker system which, at least in part, overcomes the problems of the known head tracker systems.

SUMMARY OF THE INVENTION

According to the present invention a head tracker system for determining a user's head orientation relative to a datum comprises: a head mounting for attachment to the user's head and a sensor system for sensing the orientation of the head mounting relative to the datum; characterised by a distinguishable marking and an optical sensor designed in use to be fixed respectively relative to a first known point fixed relative to the head mounting and a second known point fixed relative to the datum or vice versa and processing means for determining when the marking is within the field of view of the optical sensor and wherein the output of the processing means is used to correct for drift in the sensor system or to provide an independent verification that the system is functioning within preselected tolerances.

A particular advantage of a head tracker in accordance with the invention is that any drift in the system can be automatically compensated for each time a marking is detected within the field of view of the optical sensor. In addition to automatically compensating for drift the invention can further eliminate the need for an initial boresight alignment and therefore substantially reduce any delay before the system is initially fully operational. Alternatively or in addition to correcting for drift the present invention provides an independent assurance that the head tracker is functioning within prescribed tolerances. This is particularly important in applications where a further system such as a weapon aiming or infra red night vision system is reliant upon accurately knowing the user's head orientation.

The distinguishable marking can comprise a spatial pattern and/or can be defined in part at least by its colour. The only requirement of the marking is that it can be unambiguously recognised and is indicative of a known position and orientation of the head mounting relative to the fixed datum. In one embodiment it is envisaged that the marking comprises features of the environment around the user such as, in an aircraft, part of the cockpit structure or instrumentation. To increase the visibility of the marking it is preferred for it to be defined using retro-reflective material.

Alternatively the head tracker further comprises a marking generator for generating the distinguishable marking. With such a generator the colour of the marking is conveniently defined by the wavelength of the light produced by the generator. Furthermore the marking can be defined as a temporal variation by modulating the light produced by the marking generator. It could also be defined by a combination of two or more of the above three techniques for example the marking could comprise a particular shape, having a particular wavelength which is modulated on and off at a selected frequency.

In a particularly preferred implementation the visual marking is a collimated image having an axis which is predetermined and which passes through said associated known point. With such a marking the optical sensor, which preferably comprises a video camera, is focussed at infinity. A particular advantage of such an arrangement is that, since the marking is only visible when the axis of the field of view of the optical sensor and the marking are substantially coincident, the processing means knows the orientation of the head mounting relative to the known datum whenever it detects the presence of the marking.

Advantageously the first and second known fixed points are selected such that the marking is within the field of view of the sensor whenever the user's head is oriented in a direction in which it is most commonly directed during operation, typically this direction will be a substantially forward facing direction. A particular advantage of this arrangement is that it maximises the number of times the marking will be within the field of view of the optical sensor and hence maximises the frequency at which drift can be compensated for and/or verification of the system can be performed. Preferably when the optical sensor is associated with the first fixed point, that is the head mounting which conveniently comprises a helmet, the axis of the field of view of the sensor is substantially aligned with the forward looking direction of the user such that the output from the optical sensor is representative of the user's view. Such information can for example in the case of an aircraft be recorded and subsequently used to evaluate the pilot's performance. In a particularly preferred embodiment the marking generator comprises a boresight reticle unit. Advantageously when the head tracker system is for use in an aircraft or other vehicle which includes a head-up display the distinguishable marking is generated using the head-up display.

Alternatively when the marking is not a collimated image, such as for example a physical marking, an uncollimated light source or array of such sources, the optical sensor is focussed at a distance which corresponds with the expected distance between the sensor and the marking. Since the marking will be visible over a larger part of the field of view of the sensor the processing means is operable to detect the position of the marking within the field of view of the sensor in order to determine the orientation of the head mounting. To reduce the amount of processing the processing means is preferably operable to detect whenever the marking is within a selected portion of in the field of view of the sensor, such as for example within the centre position.

Advantageously the optical sensor comprises a video camera, such as a charge coupled device. Preferably the head tracker system further comprises at least two known fixed points having a respective distinguishable marking associated with it.

In a preferred embodiment the processing means comprises a correlator operable to correlate scene data captured by the optical sensor with data which is representative of the or each marking to determine if the or each marking is within, and/or where it is within, the field of view of the optical sensor.

BRIEF DESCRIPTION OF THE DRAWINGS

A head tracker system in accordance with the invention will now be described by way of example only with reference to the accompanying drawing which shows a schematic of a head tracker system for use in an aircraft.

DETAILED DISCUSSION OF PREFERRED EMBODIMENTS

Referring to the drawing there is shown a helmet 2 which constitutes a head mounting for attachment to the head of a pilot, the helmet being provided with a visor 4. Internally the helmet 2 is provided with a helmet mounted display (HMD) device (not shown) which is arranged to project a display onto a partially reflective inner surface of the visor 4 or discrete eyepiece so that the display is superimposed upon at least part of the view seen by the pilot through the visor 4. As is known the symbology displayed on the HMD is generated by a symbol generator 6 which is located within the aircraft. The signals used to drive the HMD are passed to the helmet 2 along an umbilical cord 8 which is provided, in a known manner, with a quick release connector arrangement 9 fixed inside the cockpit.

The helmet 2 supports a sensor unit 10 which comprises part of a magnetic head tracker system in conjunction with a transmitter unit 12 which is secured to the cockpit canopy close to the helmet 2. The transmitter unit 12 produces three orthogonal magnetic fields which are detected by respective sensors in the sensor unit 10. The sensors are operable to produce signals which are related to the orientation of the helmet 2 about three axes: elevation, azimuth and roll; relative to a predetermined datum 13 which is set relative to the airframe. These signals from the sensor unit 10 are passed via the umbilical cord 8 to a processor unit 14 which determines the orientation of the helmet 2 relative to the airframe in terms of angular orientation about each of these axes. In the embodiment illustrated the magnetic head tracker is a known system as for example described in European patent 0285658 which is hereby incorporated by way of reference. It will be appreciated that the present invention also applies to other forms of head tracker system such as, for example, those based on inertial sensors or a hybrid system. The output from the processor unit 14 is passed to the symbol generator 6 which utilises this data to ensure the symbology displayed on the HMD is correctly orientated for the pilot's current head orientation. To ensure the symbology is appropriately orientated with ground stabilised features the symbol generator 6 also receives an input from the aircraft's inertial navigation system 16 specifying the aircraft's current orientation.

In addition to the head tracker system described so far, which comprises a known arrangement, the head tracker system further comprises a miniature charged coupled device (CCD) colour video camera 18 which is rigidly mounted to the helmet 2. The axis of the field of view of the video camera 18 is accurately aligned to a set reference axis within the helmet 2. Typically the axis of the camera is set to correspond to the forward looking direction of the pilot and is focussed at infinity or slightly less to compensate for any effect the canopy windshield 20 may have such that its output is representative of the view seen by the pilot less any symbology generated by the HMD. In the context of the present invention infinity, in practical terms, corresponds to four metres or more. The resolution of the camera is of a VGA standard, that is six hundred and forty by four hundred and eighty pixels. The video signal from the camera is fed via the umbilical cord 8 to a video processor 22 which accurately overlays the symbology generated by the symbol generator 6 and the composite video signal is recorded on a video recorder 24. The video signal recorded by the recorder 24 is representative of what the pilot will have seen during the flight and is used after the flight to evaluate the pilot's performance.

Mounted to the airframe at a known location there is provided a boresight reticle unit (BRU) 26 which produces a collimated beam of light of a pre-selected wavelength containing a distinguishable symbol or marking such as a circle and cross. The axis of the collimated image produced by the BRU 26 is aligned along a predetermined direction which, in the example described, is selected to correspond with the forward looking direction of the pilot. As will now be described, the BRU 26 together with the video camera 18 is used to automatically update, or boresight, the tracker system 10, 12, 14.

In operation, the video signal from the camera 18 is also fed via a wavelength selective filter 27 to a correlator processor unit 28 which continuously processes the video data to detect for the presence of the recognised marking generated by the BRU 26. The wavelength selective filter 27 is operable to extract the marking from the rest of the video frame. Whenever the correlator processor unit 28 detects the presence of the recognised marking the system knows that the helmet 2 must have been oriented in a particular direction at the time when this video image was captured. This known orientation is compared with the output from the tracker system at that particular time to determine if there is any offset between the readings and this offset is used to correct the operation of the processor unit 14. In normal operation the offset should be of the order of no more than five milliradians and the system will automatically update the processor unit 14. If however an offset is detected which is unacceptably large, for example, greater than ten milliradians, the system ceases to update the processor unit 14 and advises the pilot that a potential error in the head tracker has occurred.

As described, the BRU 26 generates a distinguishable, that is a distinctive recognisable, marking which is defined in terms of a spatial pattern, such as a cross or circle, of a pre-selected wavelength. The purpose of the BRU 26 is to generate a marking which can be unambiguously identified by the correlator processor unit 28.

The method by which the correlator processor 28 determines if the marking is within the camera's field of view can be performed using a number of techniques such as, for example, digital processing techniques, frequency detector methods or optical correlation for pattern recognition. In the first of these techniques the video signal from the camera, which is transmitted from the helmet as a standard analogue signal, is firstly digitised by the correlator processor unit 28 and these data are correlated on a pixel by pixel basis with a stored image representative of the pattern generated by the BRU 26.

If the BRU 26 defines the distinguishable marking by modulating its light output then the correlator processor unit 28 uses an appropriate technique to identify a wavelength or modulation pattern. It will be appreciated that the processing can take many forms including analogue or digital filtering or fast Fourier transforms (FFT) or optical correlation. The use of optical correlation is by far the fastest method and allows the head tracker system to be updated very rapidly.

Since the BRU 26 produces a collimated image whose axis corresponds with the forward looking direction of the pilot the distinguishable marking will only be within the field of view of the camera 18 whenever the pilot is looking in a substantially forward direction. As a result the correlator processor unit 28 can detect the presence of the marking many times a second during normal operation. Since re-orientating, or boresighting, the head tracker need only be done every several minutes, if any image captured by the video camera which is incomplete this data can be safely discarded. To reduce the amount of signal processing the correlator processor 28 can be programmed to operate at certain fixed time intervals and the BRU 26 can be operated continuously as described or switched on only during these time intervals.

It will be appreciated that the present invention is not restricted to the specific embodiments described and that modifications can be made which are within the scope of the invention. For example, the video camera 18 could be mounted on the aircraft and the BRU 26 provided on the helmet 2. Advantageously the video camera and marking are located and oriented with respect to each other such that the marking is within the field of view of the camera whenever the user's head is oriented in a direction in which it is most commonly directed during operation. Such an arrangement ensures that the processing unit is able to detect the presence of the marking a sufficient number of times in a given time interval for it to be able to compensate for any drift in the tracker system and/or provide an independent verification that the head tracker is functioning within prescribed tolerances. In the specific embodiment described this direction is selected to additionally correspond to the substantially forward looking direction of the pilot and the camera is focussed at infinity such that the output of the video camera is representative of the pilot's field of view and can, in addition to being used to compensate for tracker drift, be recorded and used to subsequently evaluate the pilot's performance. In alternative arrangements it is envisaged to orientate the camera and marking in the manner described above but without having the camera aligned with the user's forward looking direction, such as for example a camera mounted on the aircraft behind or to one side of the user and the marking generator appropriately located on the helmet or vice versa. It will be appreciated that the marking can be generated in any way provided it produces a distinguishable, that is unambiguously recognisable, marking. In alternative embodiments the BRU 26 defines the distinguishable pattern by the wavelength of light it produces, or as a temporal pattern consisting of a modulated light output, or by a combination of these techniques. With the camera focussed at infinity the marking is preferably in the form of a highly collimated image having a predetermined axis such that the marking is only visible when the axis of the field of view of the camera and the axis of the marking are coincident. In such a system the correlator processor unit need only be operable to detect for the presence of the marking within the field of view of the camera. Whilst the use of a colour video camera has been described, other forms of optical sensors, such as position sensors, can be used more especially when the marking is in the form of a collimated image having a pre-selected wavelength in which case the sensor is only required to detect for the presence of the marking.

In an alternative embodiment the marking could be in the form of an uncollimated image such as for example a physical marking, or even features of the cockpit structure or instrumentation. In such a case the camera would be focussed on the near field, that is at a distance which corresponds with the expected distance between the camera and the marking. Since such a marking will be visible over a large part of the field of view of the camera the processing means is operable to detect where the marking is within the field of view in order to determine the helmet orientation. To reduce the amount of processing required it is preferable if the processing means is operable to detect whenever the marking is within a given region of, the camera's field of view. Most conveniently this is set to correspond with the centre region.

To prevent the system distracting the user, the wavelength of the marking is preferably selected in a part of the electromagnetic spectrum which is not visible to the user such as for example in the infra red region.

In a further embodiment the marking is generated by a head-up display 30 in place of or in addition to the BRU 26. Furthermore, whilst the use of one marking generator is described, it is preferred to use a number of markings at known locations around the cockpit to further improve the accuracy of the system. Additionally, whilst the tracker system has been described in relation to an aircraft, it will be appreciated that it can be used in other applications such as other vehicles, for example, tanks or helicopters, or in any application where it is required to accurately know the user's head orientation relative to a known datum, such as virtual reality systems. A particular advantage of the present invention is that the head tracker system is automatically and continuously boresighted during operation which can be used to compensate for drift in the head tracker.

Alternatively or in addition to correcting for drift the present invention provides an independent assurance that the head tracker is functioning within prescribed tolerances. This is particularly important in applications where a further system such as a weapon aiming or infra red night vision system is reliant upon accurately knowing the user's head orientation. In addition to automatically compensating for drift in a head tracker system the present invention can potentially eliminate the need for an initial boresight alignment and this can substantially reduce any delay before the system is initially fully operational.

In yet a further embodiment the video camera is arranged to image through the visor such that the camera has the same field of view as that of the pilot and includes the symbology generated by the HMD. A particular advantage of this system is that it eliminates the need for overlay of the symbology upon the imaged scene by the display processor thereby providing a more accurate composite picture. Moreover such a system can provide a complete end to end check of commanded image to displayed image for integrity monitoring purposes. The boresight check will occur with coincidence of eye, camera, alignment symbol and BRU which can provide an even greater assurance of correct operation. A further advantage of such a system is that it can be used to check for the presence of primary flight symbology.

What is claimed is:

1. A head tracker system for determining a user's head orientation relative to a datum comprising: a head mounting for attachment to the user's head and a sensor system for sensing the orientation of the head mounting relative to the datum; characterised by a distinguishable marking and an optical sensor designed in use to be fixed respectively relative to a first known point fixed relative to the head mounting and a second known point fixed relative to the datum or vice versa and processing means for determining when the marking is within the field of view of the optical sensor and wherein the output of the processing means is used to correct for drift in the sensor system or to provide an independent verification that the system is functioning within preselected tolerances.

2. A head tracker system according to claim 1 wherein the distinguishable marking comprises a spatial pattern.

3. A head tracker system according to claim 1 wherein the distinguishable marking is defined in part at least by the colour of the marking.

4. A head tracker system according to claim 1, and further comprising a marking generator for generating the distinguishable marking.

5. A head tracker system according to claim 4 wherein the colour of the marking is defined by the wavelength of the light produced by the marking generator.

6. A head tracker system according to claim 4 wherein the marking is defined in part at least by modulating the light produced by the marking generator.

7. A head tracker system according to claim 1 wherein the marking is a substantially collimated image having an axis which is predetermined and which passes through said associated known point.

8. A head tracker system according to claim 1 wherein the first and second known fixed points are selected such that the marking is within the field of view of the optical sensor whenever the user's head is oriented in a direction in which it is most commonly directed during operation.

9. A head tracker system according to claim 8 wherein when the optical sensor is associated with the first known point, the axis of the field of view of the sensor is substantially aligned with the forward looking direction of the user.

10. A head tracker system according to claim 7, wherein the marking generator comprises a boresight reticle unit.

11. A head tracker system according to claim 7, when used in an aircraft or other vehicle which includes a head-up display, further comprises using the head-up display to produce the distinguishable marking.

12. A head tracker system according to claim 1 wherein the optical sensor comprises a video camera.

13. A head tracker system according to claim 1 and further comprising at least two known fixed points having a respective distinguishable marking associated with it.

14. A head tracker system according to claim 1 wherein the processing means is operable to correlate scene data captured by the optical sensor with data which is representative of the or each marking to determine if the or each marking is within, and or where it is within, the field of view of the optical sensor.

* * * * *